United States Patent [19]

Ogawa et al.

[11] Patent Number: 4,863,793

[45] Date of Patent: Sep. 5, 1989

[54] MAGNETIC RECORDING MEDIUM

[75] Inventors: Hiroshi Ogawa; Shinji Saito; Toshihiko Miura, all of Kanagawa, Japan

[73] Assignee: Fuji Photo Film Co., Ltd., Kanagawa, Japan

[21] Appl. No.: 150,859

[22] Filed: Feb. 1, 1988

[30] Foreign Application Priority Data

Jan. 30, 1987 [JP] Japan .................................. 62-18633

[51] Int. Cl.⁴ ................................................ G11B 5/70
[52] U.S. Cl. .................................... 428/323; 427/131; 428/336; 428/694; 428/900
[58] Field of Search ................ 428/323, 694, 900, 336; 427/131

[56] References Cited

U.S. PATENT DOCUMENTS

| | | |
|---|---|---|
| 4,091,158 | 5/1978 | Kasuga et al. ...................... 428/900 |
| 4,275,113 | 6/1981 | Saito et al. ........................... 428/900 |
| 4,396,668 | 8/1983 | Saito et al. ........................... 428/900 |
| 4,528,240 | 7/1985 | Miyoshi et al. ...................... 428/694 |
| 4,619,856 | 10/1986 | Kamada et al. ...................... 427/131 |
| 4,666,769 | 5/1987 | Miyata et al. ........................ 427/131 |

Primary Examiner—Paul J. Thibodeau

[57] ABSTRACT

A magnetic recording medium comprising a non-magnetic support having provided thereon at least one underlayer containing non-magnetic particles and a binder, and a magnetic layer containing ferromagnetic particles and binder, in the order listed, the ferromagnetic particles being ferromagnetic iron oxide particles, cobalt-modified ferromagnetic iron oxide particles, or ferromagnetic alloy particles having an average long axis length of not more than 0.30 μm measured by a transmission electron microscope and having a crystal size of not more than 300 Å measured by X-ray diffractiometry.

8 Claims, 1 Drawing Sheet

MAGNETIC RECORDING MEDIUM

FIELD OF THE INVENTION

The present invention relates to a magnetic recording medium having improved electromagnetic characteristics, durability and head wear-out resistance.

BACKGROUND OF THE INVENTION

Magnetic recording media comprising a non-magnetic support having provided thereon a magnetic layer containing ferromagnetic iron oxide particles, ferromagnetic alloy particles and binders are widely used as media of video tapes, audio tapes, and so on.

In recent years, with the strong demand for higher density recording in magnetic recording media, demands for higher vision image qualities and higher sound qualities have increased. Therefore, it has been necessary that electromagnetic properties be improved, that is, particularly that C/N (the ratio of carrier to noise) be increased and that BN (bias noise) be decreased.

For the above purposes, the size of ferromagnetic particles must be lessened and the number of magnetic particles per unit volume must be increased. However, if the specific surface area of ferromagnetic particles is increased to increase the number of magnetic particles per unit volume, voids are formed on the surface of the ferromagnetic particles and in actuality, the particle size is not so small as desired or the axis ratio of the long axis length to the short axis length becomes lower, whereby the above objects can not be fulfilled. In other words, there are some problems in that if voids are formed, loss of magnetic susceptibility increases and that if the axis length ratio of the ferromagnetic particles becomes lower, magnetic orientation of magnetic particles is not carried out effectively upon preparing a magnetic recording medium. Further, if the size of ferromagnetic particles is lessened, print-through characteristics are deteriorated due to increase of composition (particles) having low coercive force and the resulting medium can not be used practically. Furthermore, if the size of ferromagnetic particles is lessened, the light-transmission degree of a magnetic layer increases. In a video tape deck (VHS type, 8 mm type and so on), the end of a tape is detected by a photosensor capable of detecting light at about 900 nm wavelength, and therefore, the light-transmission degree of a tape needs to be 10% or less to avoid an erroneous end-of-tape operation of the photosensor. Accordingly, when the size of ferromagnetic particles is lessened, it is necessary to add light-intercepting particles into a magnetic layer in a large amount, to provide a thick backing coat layer to light-intercept if necessary, or to provide another light-intercepting layer.

However, when light-intercepting particles are added into a magnetic layer in a large amount, electromagnetic properties are deteriorated. When a backing coat layer or another light-intercepting layer is provided to intercept light, surface properties and electromagnetic properties tends to be deteriorated by the orange peel of the backing layer caused by making the layer thick.

When the size of ferromagnetic particles is increased to ensure satisfactory print through characteristics, there is a problem in that head wear-out increases.

SUMMARY OF THE INVENTION

An object of the present invention is to provide a magnetic recording medium having improved electromagnetic properties, improved durability, and improved wear-out resistance of head.

As a result of thorough investigations to solve the above described problems, the inventors of the present invention found that the above and other, objects can be attained by the invention hereinafter described.

That is, the present invention is directed to a magnetic recording medium comprising a non-magnetic support having provided thereon at least one underlayer containing non-magnetic particles and a binder, and a magnetic layer containing ferromagnetic particles and binder, in the order listed, the ferromagnetic particles being ferromagnetic iron oxide particles, cobalt-modified ferromagnetic iron oxide particles, or ferromagnetic alloy particles having an average long axis length of not more than 0.30 $\mu$m measured by a transmission electron microscope and having a crystal size of not more than 300 Å measured by X-ray diffractiometry.

In the present invention, it is preferred that binders particularly for the underlayer are non-hardenable resins (thermosetting resins) and that the underlayer and the magnetic layer are provided by a wet-on-wet method when the magnetic layer has a 2 $\mu$m thickness or less.

DETAILED DESCRIPTION OF THE INVENTION

Figure 1:
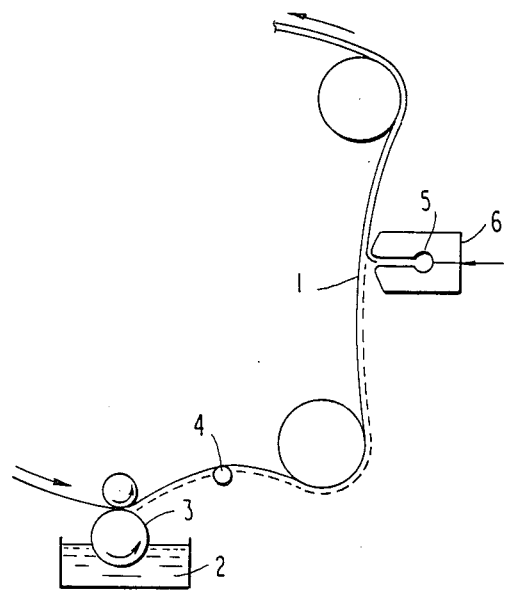
FIG. 1 is an exemplary drawing showing an embodiment of an apparatus for conducting a wet-on-wet coating method (i.e., successive coating) for providing a magnetic recording medium according to the present invention.

The present invention is hereinafter described in more detail.

The ferromagnetic particles used for the magnetic layer of the present invention are ferromagnetic iron oxide particles or Co-containing ferromagnetic iron oxide particles having an average long axis length of not more than 0.30 $\mu$m measured by a transmission electron microscope (as disclosed in detail in *Ryudo Sokutei Gijutsu* (Grain Size Measurement Technology), page 39, published by Nikkan Kogyo Press on Aug. 20, 1975) and having a crystal size of not more than 300 Åmeasured by X-ray diffractiometry (as disclosed in detail in *X-sen Kesshoqaku* (X-ray Crystallography), page 489, authored by Isamu Nitta, published by Maruzen Shuppan Co., Ltd. on Jan. 5, 1961), and preferably having an average long axis length of 0.20 $\mu$m or less and a crystal size of 250 Å or less.

The average long axis length is not more than 0.3 $\mu$m and the crystal size is not more than 300 because modulation noise and bias noise of the resulting magnetic recording medium are undesirably increased if the noted values are exceeded.

The coercive force of a magnetic layer is preferably from 350 to 5,000 Oe, more preferably from 600 to 2,500

Oe, and most preferably from 800 to 2,000 Oe. A coercive force f less than 350 Oe is not preferred, because the electromagnetic properties of audio normal position tapes are deteriorated. A coercive force of about 5000 Oe or more is not preferred either, because signals are not readily recorded.

The magnetic layer preferably has a thickness of 2 $\mu$m or less, and more preferably 1 $\mu$m or less. A thickness of more than about 2 $\mu$m is not preferred, because electromagnetic properties are deteriorated.

The ferromagnetic iron oxide paticles used for a magnetic layer of the present invention are $\gamma$-Fe$_2$O$_3$, Fe$_3$O$_4$ and ferromagnetic iron oxide particles therebetween represented by FeO$_x$ (1.33 < x ≦ 1.5). Cobalt-containing ferromagnetic iron oxide particles used in the present invention are those above-described iron oxides to which Co is added (Cobalt modified) and are represented by Co-FeO$_x$(1.33 < x ≦ 1.5).

The ferromagnetic alloy particles used for the magnetic layer of the present invention are alloy particles mainly comprised of iron, and are prepared, for example, by the following methods.

(1) A method of reducing iron oxide which comprises reducing acicular iron oxyhydroxide, acicular oxyhydroxide containing other metals, or acicular iron oxide obtained from those oxyhydroxides (as described e.g., in U.S. Pat. Nos. 3,186,829 and 3,190,748).

(2) A low-pressure vacuum evaporation method which comprises vapor depositing ferromagnetic metals in an inactive gas at low pressure (as described e.g., in U.S. Pat. No. 3,598,568, 3,607,220, and 3,702,270).

(3) A method of reducing metal salts capable of forming ferromagnetic composition in an aqueous solution of the metal salts by reducing substances such as boron hydride compounds, hypophosphite or hydrazine to obtain ferromagnetic particles (as described e.g., in Japanese Pat. Application (OPI) Nos. 25620/71, 4131/72, and 27718/72) (the term "OPI" used herein means a published unexamined Japanese Patent Application).

(4) A method which comprises heat-decomposing organic acid salts of ferromagnetic metals and reducing them with reducing gases (as described e.g., in U.S. Pat. Nos. 2,983,997, 3,172,776, and 3,200,007).

(5) A method of heat-decomposing metal carbonyl compounds (as described e.g., in U.S. Pat. Nos. 3,198,717, 3,156,650, and 3,262,812).

(6) A method which comprises electrodepositing ferromagnetic metal particles using a mercury cathode and separating the particles from the mercury (as described e.g., in U.S. Pat. Nos. 3,607,218, 3,756,866, and 3,206,338).

In the present invention, ferromagnetic metal particles prepared in accordance with the methods (1), (2), and (3) are easy to prepare and use, and particularly those particles prepared in accordance with the method (1) are the most preferred because of cost and quality thereof. Upon preparing ferromagnetic metal particles of the present invention, it is desirable to provide an oxide film on the surface of particles to improve chemical stability of the metal particles.

The composition of ferromagnetic alloy particles is pure iron or alloys such as Fe, Fe-Ni, or Fe-Ni-Co and non-magnetic or non-metallic elements such as B, C, N, Al, Si, P, S, Ti, Cr, Mh, Cu, or Zn may be incorporated therein in a slight amount to improve characteristics such as magnetic properties including coercive force and squreness ratio, anti-oxidation property, and dispersibility.

Upon preparing ferromagnetic alloy particles of the present invention, manufacturing conditions are determined according to the description of the references in which the manufacturing methods are described so that a desirable average long axis length and crystal size can be obtained.

The binders of a magnetic layer can be thermoplastic binder, and preferably are hardenable binders hardened with isocyanate and the like when a rotating head is made run at a high speed on a video tape recorder or a DAT (digital audio tape). Examples of the hardenable binder include a composition comprising a vinyl chloride/vinyl acetate copolymer, and a polyisocyanate.

Suitable non-magnetic particles used for the underlayer of the present invention include carbon black, graphite, titanium oxide, barium sulfide, ZnS, MgCO$_3$, ZnO, CaO, $\gamma$-iron oxide, tungsten disulfide, molybdenum disulfide, boron nitride, MgO, SnO$_2$, SiO$_2$, Cr$_2$O$_3$, $\alpha$-Al$_2$O$_3$, SiC, cerium oxide, corundom, artificial diamond, $\alpha$-iron oxide, garnet, silica, silicon nitride, boron nitride, silicon carbide, molybdenum carbide, boron carbide, tungsten carbide, titanium carbide, diatomaceous earth and dolomite. Preferred particles are inorganic particles such as carbon black, CaCO$_3$, titanium oxide, barium sulfide, $\alpha$-Al$_2$O$_3$, $\alpha$-iron oxide or $\gamma$-iron oxide and polymer particles such as polyethylene particles.

The above described particles are generally used as abrasive agents or pigments. When non-magnetic particles are non-acicular, the particles size thereof is from 1 to 1,000 m$\mu$, preferably from 1 to 500 m$\mu$. When they are acicular, the long axis length is generally from 100 m$\mu$ to 5 $\mu$m, preferably from 100 m$\mu$ to 3 $\mu$m, and the short axis length is generally from 1 to 1,000 m$\mu$, preferably from 1 to 500 m$\mu$.

Suitable binders used for the non-magnetic underlayer in the present invention may be the above described hardenable resins, and may be thermoplastic resins of non-hardenable resins which do not contain a hardening agent such as polyisocyanate (composition of hardening reaction).

Suitable thermoplastic resins include vinyl chloride-vinyl acetate resins, vinyl chloride-vinyl acetate resins containing functional groups, (meth)acrylate type copolymers, saturated polyester resins, polyurethane resins, polyurethane resins having functional groups and cellulose type resins, and particularly vinyl chloride-vinyl acetate resins having functional groups, polyurethane resins and polyurethane resins having functional groups are preferred. The preferred functional groups include —SO$_3$M group, —COOM group, —OM group, —OSO$_3$M group, and

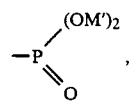

wherein M is hydrogen or an alkali metal, M' is hydrogen, an alkali metal or a hydrocarbon group.

The preferred polyurethane resins include polyester polyurethane, polyether polyurethane, polyester ether polyurethane, polycaprolactone polyurethane and polycarbonate polyurethane.

Generally, an undercoated layer is provided in a magnetic recording medium, and it is provided to improve adhesiveness between a support and a magnetic layer and the like, and has a thickness of about 0.5 μm or less. Therefore, it is entirely different from the underlayer of the present invention. However, an undercoated layer may be provided to improve adhesiveness between the underlayer and the support in the present invention.

Generally used additives such as lubricating agents, abrasive agents, dispersing agents, antistatic agents, and rust-preventing agents can be added to the magnetic layer of the present invention.

The coating solution for an underlayer is prepared by mixing and kneading the binders, the non-magnetic particles, and various additives, if necessary, using an organic solvent. The amount of the binder is generally from 10 to 300 parts by weight, preferably from 15 to 100 parts by weight, and more preferably from 20 to 50 parts by weight pre 100 parts by weight of the non-magnetic particles.

The coating solution for an magnetic layer is prepared by mixing and kneading the binders, the ferromagnetic particles, and various additives, if necessary, using an organic solvent. The amount of the binder is generally from 10 to 300 parts by weight, preferably from 15 to 100 parts by weight, and more preferably from 20 to 50 parts by weight pre 100 parts by weight of the ferromagnetic particles.

Suitable organic solvents used upon dispersing and coating the coating solution include ketones such as acetone, methyl ethyl ketone, methylisobutyl ketone, or cyclohexanone; esters such as methyl acetate, ethyl acetate, butyl acetate, ethyl lactate or monoethyl ether of glycol acetate; ethers such as ethyl ether, glycol dimethyl ether, glycol monoethyl ether, dioxane or tetrahydrofuran; aromatic hydrocarbons such as benzene, toluene or xylene; and chlorinated hydrocarbons such as methylene chloride, ethylene chloride, carbon tetrachloride, chloroform, ethylenechlorohydrin or dichlorobenzene.

Suitable materials for the support of the present invention include polyesters such as polyethylene terephthalate or polyethylene 2,6-naphthalate; polyolefins such as polyethylene or polypropylene; cellulose derivatives such as cellulose triacetate; and plastics such as polycarbonate, polyimide or polyamide imide.

A backing layer may be provided on the opposite surface of a support from the surface on which a magnetic layer is provided.

When non-hardenable resins are used as binders for an underlayer in the present invention, it is preferred that an underlayer and an upper layer are provided by a so-called wet-on-wet coating method wherein a coating solution for an underlayer is coated, and then a coating solution for an upper layer is coated while the underlayer is undried. This method is applied particularly when a magnetic layer is a thin layer having 2 μm or lower thickness.

The wet-on-wet coating method for coating an underlayer and a magnetic layer in the present invention includes a sequential coating method wherein a first layer is coated and a second layer is then coated thereon while the first layer is undried and an extrusion coating method wherein multilayers are provided simultaneously.

The method for preparing a magnetic recording medium as disclosed in Japanese Pat. Application (OPI) No. 139929/86 can be applied as a wet-on-wet coating method in the present invention.

FIG. 1 shows an exemplary apparatus to explain a sequential coating method for providing two layers. A coating solution (a) 2 for an underlayer is precoated on a flexible support 1 such as a polyethylene terephthalate film which travels continuously by a coating device (A) 3. Immediately thereafter, the coated surface of the support undergoes a smoothing treatment by a smoothing roll 4. While the above coating solution (a)2 is wet, a coating solution (b) is extruded from the extrusion coating device (B) 6 and is coated thereon 5 indicates a coating solution (b).

Figure 2:
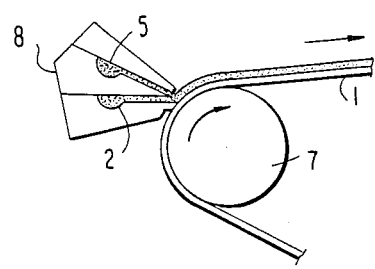
FIG. 2 is also an exemplary drawing showing an embodiment of an apparatus for conducting a wet-on-wet coating method (i.e., simultaneous multiple layer coating) for providing a magnetic recording medium according to the present invention.

FIG. 2 shows an exemplary apparatus to explain an extrusion type simultaneously multicoating method for providing two layers. A coating solution (a) 2 and a coating solution (b) 5 for an upper layer are simultaneously coated on a plastic support 1. through a simultaneous multiple layer coating device for supplying solutions. The support having provided thereon two layers undergoes magnetic orientation, drying and smoothing treatment to obtain a magnetic recording medium. 7 indicates a backup roll and 8 indicates a simultaneous multiple layer coating device.

The present invention is illustrated in more detail by the following example.

EXAMPLE

| Coating solution A for an underlayer | |
|---|---|
| $\alpha\text{-Fe}_2\text{O}_3$ | 100 parts |
| Copolymer of vinyl chloride-vinyl acetate containing sulfonic acid group in a 0.25% (degree of polymerization 400) | 15 parts |
| Polyester polyurethane having a sulfonic acid group in 0.1% | 5 parts |
| Polyisocyanate (Collonate L-75, trade name of polyisocyanate produced by Nippon Polyurethane Industries Co., Ltd.) | 6.7 parts |
| Myristic acid (for industrial use) | 2 parts |
| Butyl stearate (for industrial use) | 1 part |
| Electroconductive carbon (20 mμ) | 10 parts |
| Methyl ethyl ketone/cyclohexanone = 7/3 solvent | 250 parts |
| Coating solution B for an underlayer | |
| $\alpha\text{-Fe}_2\text{O}_3$ | 100 parts |
| Copolymer of vinyl chloride-vinyl acetate (content of vinyl alcohol 6%) | 20 parts |
| Polycarbonate polyurethane | 5 parts |
| Myristic acid (for industrial use) | 2 parts |
| Butyl stearate (for industrial use) | 1 part |
| Electroconductive carbon (20 mμ) | 10 parts |
| Methyl ethyl ketone/cyclohexanone = 7/3 solvent | 250 parts |
| Coating solution a for an upper layer | |
| $\text{Co}-\gamma\text{-FeO}_x$ (x = 1.46, coercive force 850 Oe, average long axis length 0.28 μm, crystal size 240Å) | 100 parts |
| Copolymer of vinyl chloride-vinyl acetate containing a sulfonic acid group in 0.25% (degree of polymerization 400) | 15 parts |
| Polyester polyurethane containing a sulfonic acid group in 0.1% | 5 parts |
| Polyisocyanate (Collonate L-75) | 6.7 parts |
| Myristic acid (for industrial use) | 2 parts |
| Butyl stearate (for industrial use) | 2 parts |
| α-alumina (particle size 0.2 μm) | 3 parts |
| Electroconductive carbon (20 mμ) | 1 part |
| Methyl ethyl ketone/cyclohexanone = 7/3 solvent | 250 parts |
| Coating solution b for an upper layer | |
| $\text{Co}-\gamma\text{-FeO}_x$ (coercive force 1,200 Oe, average long axis length 0.21 μm, crystal size 240Å) | 100 parts |

-continued

| | |
|---|---|
| Copolymer of vinyl chloride-vinyl acetate containing a sulfonic acid group in 10.25% | 15 parts |
| Polyester polyurethane containing a sulfonic acid group in 0.1% | 5 parts |
| Polyisocyanate (Collonate L-75) | 6.7 parts |
| Myristic acid (for industrial use) | 2 parts |
| Butyl stearate (for industrial use) | 1 part |
| α-alumina (particle size 0.2 μm) | 5 parts |
| Methyl ethyl ketone/cylohexanone = 7/3 solvent | 250 parts |

The single layers and multilayers were provided using the above described coating solutions. The multilayers were provided in accordance with a known wet-on-wet coating method.

The combinations of coating solutions and the results thereof are shown in the following table. The supports used in this example are a polyethylene terephthalate film having 14 μm thickness.

Coating solution c for an upper layer

Fe-Zn-Ni alloy (coercive force 1,200 Oe, average long axis length 0.18 μm, crystal size 150 Å) was used instead of Co-γ-$FeO_x$ in the coating solution a for an upper layer.

Coating solution d for an upper layer

Co-$FeO_x$(x=1.46, coercive force 850 Oe, average long axis length 0.35 μm, crystal size 310 Å) was used instead of Co-γ-$FeO_x$ in the coating solution a for an upper layer.

Coating solution e for an upper layer

Fe-Zn-Ni alloy (coercive force 1,200 Oe, average long axis length 0.32 μm, crystal size 300 Å) was used instead of Co-γ-FeOx in the coating solution a for an upper layer.

Magnetic recording media as shown in Table were prepared using the above solutions. Multiple layers were provided by a conventional wet-on-wet multicoating method. A polyethylene terephthalate film having a 14 μm thickness was used as a support.

Video sensitivity (VS), ratio of carrier/noise (C/N), print-through characteristics (S/P), head wear-out, and still life were measured regarding the above magnetic recording media in the following manner. The results thus obtained are shown in Table.

VS (dB)

The video sensitivity at 8 MHz was measured by using an amorphous magnetic head and is shown in terms of relative values when C-4 tape is assumed to have a value of 0 dB.

C/N (dB)

The carrier/noise ratio wherein the noise level was measured at a point 0.1 MHz apart from 8 MHz with respect to the sensitivity at 8 MHz was measured, and is shown in terms of relative values when C-4 tape is assumed to have a value of 0 dB.

S/P (dB)

A signal of 1 KHz was recorded to the medium and then the medium was allowed to stand at 40° C. for 48 hours. The ratio of the initial output of the signal and the output of print-through signal was measured.

Head wear (μm)

Head wear was evaluated after the medium (tape) ran for 100 hours. Still life

Still life was evaluated in terms of a period of time for S/N of the images at a still mode to decrease by 6 dB.

TABLE

| Sample No. | Coating solution for upper layer | Coating solution for underlayer | Thickness of upper layer (μm) | Thickness of under layer (μm) | VS (dB) | C/N (dB) | Still life (min.) | Head wear-out (μm) |
|---|---|---|---|---|---|---|---|---|
| 1 | a | A | 0.5 | 3.5 | 2.3 | 2.5 | 120 | 3 |
| 2 | a | A | 1.0 | 3.0 | 2.2 | 2.3 | 120 | 3 |
| 3 | a | A | 2.0 | 2.5 | 1.9 | 2.0 | 120 | 3 |
| C-1 | a | A | 2.5 | 1.5 | 0.8 | 0.7 | 120 | 3 |
| 4 | a | A | 0.5 | 1.5 | 2.3 | 2.4 | 120 | 3 |
| 5 | a | A | 0.5 | 0.5 | 2.3 | 2.2 | 100 | 4 |
| 6 | a | B | 1.0 | 3.0 | 2.4 | 2.6 | 120 | 2 |
| 7 | b | A | 1.0 | 3.0 | 3.8 | 4.2 | 120 | 2 |
| 8 | b | B | 1.0 | 3.0 | 4.1 | 4.4 | 120 | 1 |
| C-3 | a | — | 1.0 | — | 0.0 | 0.0 | 30 | 12 |
| C-4 | b | — | 1.0 | — | 1.2 | 0.8 | 20 | 10 |
| C-5 | a | — | 4.0 | — | 0.0 | 0.5 | 120 | 11 |
| C-6 | b | — | 4.0 | — | 1.4 | 1.6 | 120 | 9 |
| 9 | c | A | 1.0 | 3.0 | 5.7 | 6.2 | 90 | 1 |
| C-7 | d | A | 1.0 | 3.0 | 0.5 | 0.2 | 120 | 8 |
| C-8 | e | A | 1.0 | 3.0 | 3.8 | 2.5 | 90 | 6 |

It is clear from the results shown in the above Table that electromagnetic properties, durability and head wear-out can be improved simultaneously in accordance with the present invention.

It is clear from the results of Nos. 1 to 3 and C-1 that VS and C/N are favorably high when the upper layer has 2.0 μm or lower thickness.

It is apparent from the results of Nos. 4 and 5 and C-2 that VS and C/N are high and still life is long when the underlayer has 0.5 μm or higher thickness.

No. 6 exhibits excellent results even though compositions of ferromagnetic particles and binders used in the underlayer are different.

No. 7 and No. 8 exhibit excellent results even though ferromagnetic particles used in the upper layer are different.

It is understood from the results of C-3 and C-4 that effects cannot be obtained when only a thin upper layer is provided without providing an underlayer.

It is clear from the results of C-5 and C-6 that effects cannot be obtained when only even a thicker upper layer is provided without providing an underlayer.

It is understood from the results of No. 9 that objects of the present invention can be obtained even when ferromagnetic alloy particles are used in the upper layer.

It is clear from the results of C-7 and C-8 that objects of the present invention cannot be obtained when the average long axis length is 0.30 μm or higher and the crystal size is 300 Å or higher.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having provided thereon at least one underlayer having a thickness of 0.5 μm or more containing non-magnetic particles and a binder, and a magnetic layer having a thickness of 2 μm or less containing ferromagnetic particles and binder, in the order listed, said ferromagnetic particles being ferromagnetic iron oxide particles, cobalt-modified ferromagnetic iron oxide particles, or ferromagnetic alloy particles having an average long axis length of not more than 0.30 μm measured by a transmission electron microscope and having a crystal size of not more than 300 Å measured by X-ray diffractiometry, wherein said underlayer and said magnetic layer are provided by a wet-on-wet method.

2. A magnetic recording medium as claimed in claim 1, wherein said ferromagnetic particles have an average long axis length of not more than 0.20 μm measured by a transmission electron microscope and have a crystal size of not more than 250 Å measured by X-ray diffractiometry.

3. A magnetic recording medium as claimed in claim 1, wherein said magnetic layer has a thickness of 1 μm or less.

4. A magnetic recording medium as claimed in claim 1, wherein said magnetic layer has a coercive force of from 350 to 5,000 Oe.

5. A magnetic recording medium as claimed in claim 4, wherein said magnetic layer has a coercive force of from 600 to 2,500 Oe.

6. A magnetic recording medium as claimed in claim 5, wherein said magnetic layer has a coercive force of from 800 to 2,000 Oe.

7. A magnetic recording medium as claimed in claim 1, wherein said non-magnetic particles are non-acicular and have a particle size of from 1 to 1,000 mμ or said non-magnetic particles are acicular and have a long axis length of from 100 mμ to 5 μm and a short axis length of from 1 to 1,000 mμ.

8. A magnetic recording medium as claimed in claim 7, wherein said non-magnetic particles are non-acicular and have a particle size of from 1 to 500 mμ or said non-magnetic particles are acicular and have a long axis length of from 100 mμ to 3 μm and a short axis length of from 1 to 500 mμ.

* * * * *